United States Patent
Chadbourne

[15] 3,677,201
[45] July 18, 1972

[54] PALLET
[72] Inventor: Gilbert R. Chadbourne, Oakland, Maine
[73] Assignee: Keyes Fibre Company, Waterville, Maine
[22] Filed: Dec. 17, 1969
[21] Appl. No.: 885,947

[52] U.S. Cl. ........................................................108/58
[51] Int. Cl. ..................................................B65d 19/18
[58] Field of Search ........................108/51–58; 217/26, 217/26.5; 248/188, 188.1, 188.2, 188.3, 188.4, 188.5, 188.8, 174

[56] References Cited

UNITED STATES PATENTS

| | | | |
|---|---|---|---|
| 2,544,657 | 3/1951 | Cushman | 108/53 |
| 3,526,195 | 9/1970 | Maryonovich | 108/53 |
| 2,691,499 | 10/1954 | Watts | 108/58 X |
| 2,908,464 | 10/1959 | Traudt, et al. | 108/58 X |
| 2,973,931 | 3/1961 | Brown | 108/53 |
| 3,104,085 | 8/1963 | Skladny | 108/51 X |
| 3,380,403 | 4/1968 | Sullivan | 108/51 |
| 3,407,758 | 10/1968 | Simkins | 108/51 |
| 3,435,784 | 4/1969 | Petersen | 108/51 |

Primary Examiner—Bobby R. Gay
Assistant Examiner—Glenn O. Finch
Attorney—Connolly and Hutz

[57] ABSTRACT

Pallet includes upper load bearing platform with plurality of composite support members secured thereto for spacing platform predetermined distance away from surface upon which pallet is resting. Each support member comprises upper and lower molded sheets of uniform thickness throughout. Each sheet has alternately arranged hollow pocket and post formations. Lower sheet is inverted relative to upper sheet with pocket formations of upper sheet nested inside hollow post formations of inverted lower sheet. Upper and lower sheets are secured together.

14 Claims, 6 Drawing Figures

PALLET

BACKGROUND OF THE INVENTION

The present invention relates to a load bearing pallet of the type adapted to receive the tines of a fork-lift vehicle, and more particularly to a pallet produced at low cost having molded support members that position the load bearing platform of the pallet a predetermined distance away from the surface upon which the pallet is resting.

Fork-lift vehicles are commonly used in the handling of heavy and bulky materials. Such vehicles are conventionally used in conjunction with load bearing pallets containing openings into which the tines of the vehicles extend and on which the materials to be transported or otherwise handled are supported. In view of the fact that wooden and metal pallets are quite expensive, many pallets now being produced are made of less expensive materials such as corrugated paperboard, cardboard, and molded pulp, for example. While pallets of this general type are not usually as durable as wooden and metal pallets they are sufficiently less expensive to produce so that they may be disposed of after a single use. Disposable pallets are particularly desirable where goods are shipped from a manufacturing facility to a distant point, as it eliminates the necessity of returning the empty pallets. Even in instances where pallets constructed of less expensive materials are returned to their point of origin or continuously used at a single location inexpensive pallet constructions are quite appealing.

Many pallets including portions fabricated from cardboard and molded pulp, for example, although lighter and less expensive than wood and metal pallets, do not have sufficient strength and rigidity to carry the loads which are often required to be handled. Moreover, such pallets tend to buckle and tear which renders them undesirable for even one use let alone continued use.

Accordingly, it is an object of the present invention to provide a light-weight, inexpensive, and easy to produce pallet which is extremely strong and capable of bearing heavy loads.

SUMMARY OF THE INVENTION leaker,"

In accordance with the present invention a pallet includes an upper load bearing platform with a plurality of composite support members secured thereto for spacing the platform a predetermined distance away from the surface upon which the pallet is resting. Each support member comprises upper and lower molded sheets of uniform thickness throughout. Each sheet has alternately arranged hollow pocket and post formations. The lower sheet is inverted relative to the upper sheet with the pocket formations of the upper sheet nested inside the hollow post formations of the inverted lower sheet. The molded sheets of each support member are secured together.

In the preferred embodiment of the present invention the upper molded sheet of each support member is oriented 90° relative to the inverted lower sheet. Moreover, each upper sheet may include an outwardly directed peripheral flange secured to the underside of the load bearing platform. In certain instances a lower platform may be provided as well as an outwardly directed peripheral flange on each inverted lower sheet. The lower flanges are secured to the upper side of the lower platform. Preferably, the upper and lower sheets of each support member are secured together with adhesive, and each sheet is molded of fibrous pulp.

BRIEF DESCRIPTION OF THE DRAWING

Novel features and advantages of the present invention in addition to those mentioned above will become apparent to one skilled in the art from a reading of the following detailed description in conjunction with the accompanying drawing wherein.

DETAILED DESCRIPTION OF THE INVENTION

Figure 1:
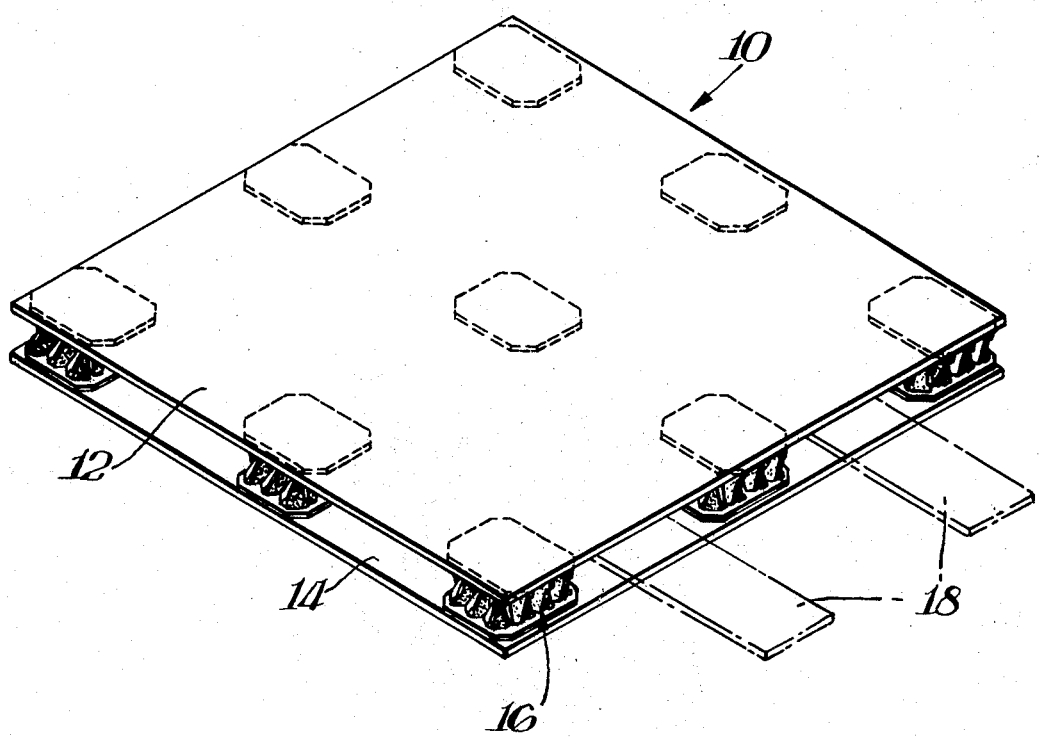
FIG. 1 is a perspective view of a pallet according to the present invention with the tines of a fork-lift vehicle shown in phantom.

Referring in more particularity to the drawing, FIG. 1 illustrates a pallet 10 having an upper load bearing platform 12 fabricated of high strength paperboard, corrugated cardboard, plywood, or similar material. The pallet also has a lower platform 14 constructed of similar material. Composite support members 16 are secured between the upper and lower platforms 12 and 14 for spacing the upper load bearing platform a predetermined distance away from the surface upon which the pallet 10 is resting. In certain instances the lower platform 14 may be eliminated especially when the pallet is used for light loads.

The composite support members 16 are arranged between the upper and lower platforms of the pallet, as shown in FIG. 1. With such an arrangement, one support member is located in each of the four corners of the pallet and one support member is centrally located at each outer edge. Also, one support member is located at the center of the pallet. This arrangement provides a pair of longitudinal openings at each side of the pallet into which the tines 18 of a fork-lift vehicle (not shown) may be easily inserted. Other arrangements of pallet support members are also within the scope of this invention.

FIGS. 2–5 show a composite support member 16 and the individual components thereof. Basically, each composite support member 16 comprises an upper molded sheet 20 and a lower molded sheet 22. Each sheet is of uniform thickness throughout and has alternately arranged hollow pocket formations 24 and hollow post formations 26. The sheets are designed so that the pocket formations of the upper sheet 20 nest inside the hollow post formations 26 of the lower sheet when the lower sheet is inverted relative to the upper sheet, as shown best in FIG. 2. In the preferred embodiment of the present invention, the upper sheet 20 of each support member 16 is oriented 90° relative to the inverted lower sheet 22. However, it is also possible to nest the pocket formations of the upper sheet inside the hollow post formations of the inverted lower sheet by shifting the sheets laterally slightly out of alignment with each other. Adhesive material 27 is utilized to bond the upper and lower sheets together to form a composite support member 16. The adhesive is applied where the upper and lower sheets engage one another.

Each molded sheet 20, 22 has an outwardly directed peripheral flange 28. As shown best in FIG. 5, the flange 28 on the upper molded sheet together with the tops of the post formations 26 engage the underside of the upper load bearing platform 12. Adhesive is applied at these contact areas to secure each support member to the under side of the upper load bearing platform. The lower molded sheet 22 of each support member 16 is secured in similar fashion to the upper side of the lower platform 14, adhesive being applied to the flange 28 and the tops of the post formations 26. Inversion of the lower molded sheet positions the flange 28 and the tops of the hollow formations 26 in contact with the upper surface of the lower platform 14. Obviously, with pallets that include only the upper load bearing platform 12, adhesive is not applied to the lower flange and post formations.

The pallet 10 according to this invention has greatly improved vertical strength and also great resistance to side and angular thrust. The composite support members are easy to manufacture and assemble. The molded sheets may be identical in design and fabricated of fibrous pulp according to known pulp slurry deposition techniques. Moreover, it is less expensive to mold and dry each piece separately than it is to produce a single sheet of double thickness. Also, the double wall thickness of the resultant composite support member contributes significantly to the overall vertical strength of the member. The peripheral flanges on the molded sheets also provide convenient areas for securing the support members to the platforms of the pallet. In addition to adhesives, mechanical fasteners such as nails, staples, and the like, may be used to secure the support members to the pallet platforms.

Figure 6:
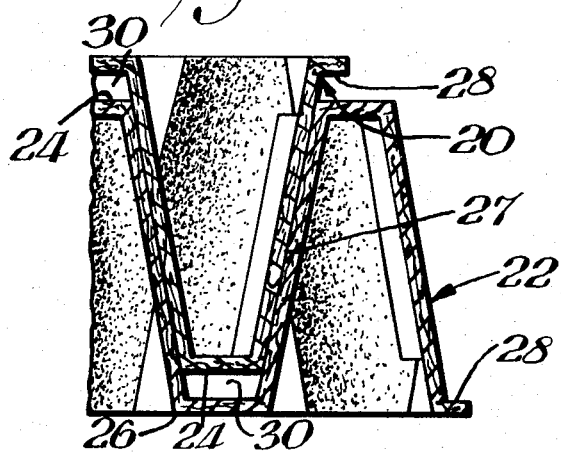
FIG. 6 is a sectional view taken along line 6—6 of FIG. 3.
Figure 2:
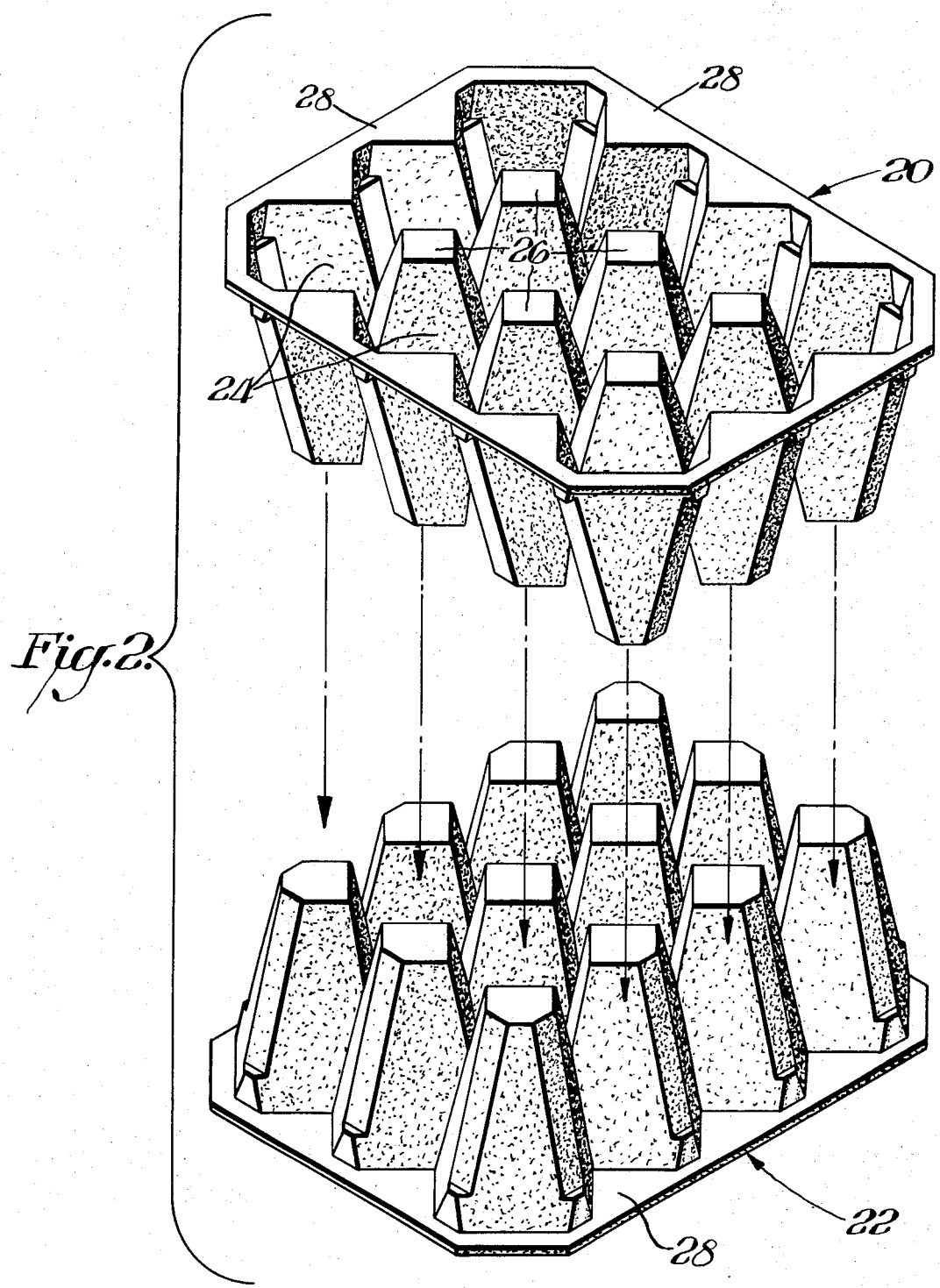
FIG. 2 is an exploded perspective view of a pallet support member according to the present invention.
Figure 3:
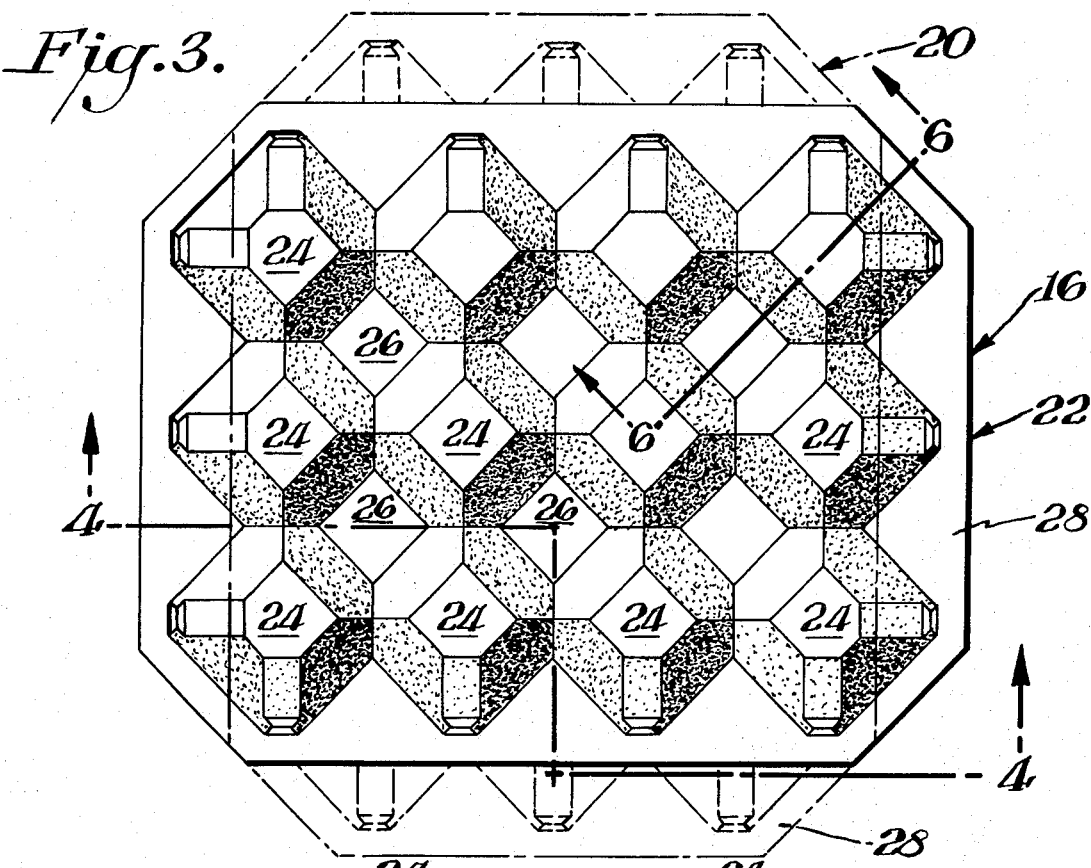
FIG. 3 is a top plan view of the lower inverted molded sheet of a pallet support member according to this invention with the upper sheet shown in phantom.
Figure 4:
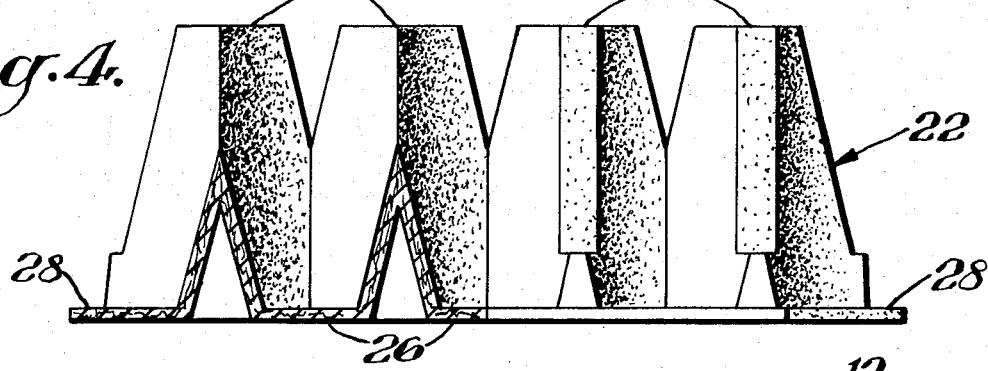
FIG. 4 is a sectional view taken along line 4—4 of FIG. 3.
Figure 5:
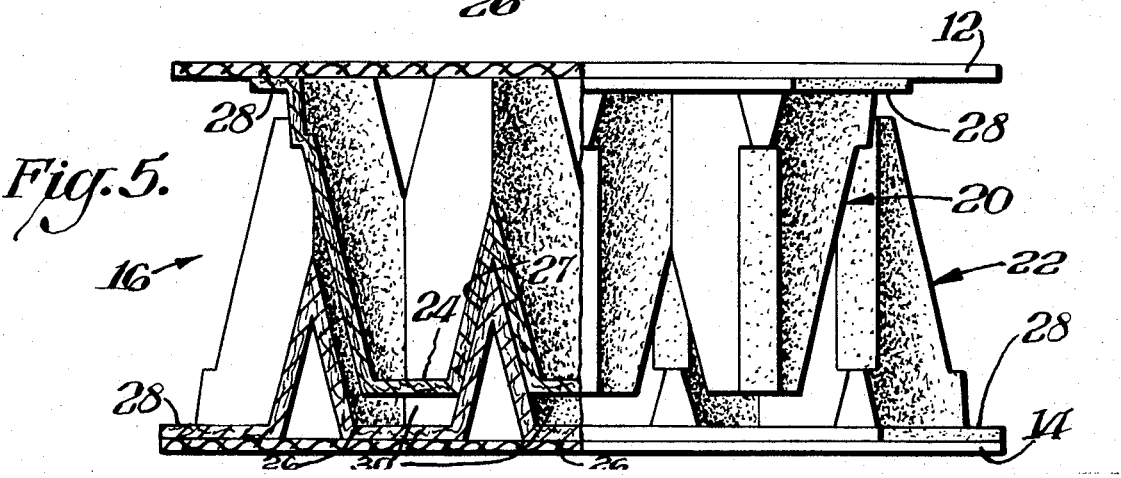
FIG. 5 is a fragmental side elevational view of a pallet according to this invention with portions broken away to show interior details of one of the pallet support members.

As shown best in FIGS. 5 and 6, the exterior end portions of the hollow pocket formations 24 of the upper sheet 20 are spaced from the interior end portions of the hollow post formations 26 of the lower sheet 22 when the pockets of the upper sheet are fully nested inside the posts of the lower inverted sheet. This arrangement assures excellent glue and friction contact between the upper and lowe sheets of each support member in the area where the sheets are forced together despite slight differences in the dimensions of the sheets. The space 30 shown in FIGS. 5 and 6 may be eliminated, if desired, provided the sheets are designed so that the same glue and friction contact is maintained when they are nested together.

What is claimed is:

1. A pallet including an upper load bearing platform with a plurality of composite support members secured thereto for spacing the platform a predetermined distance away from the surface upon which the pallet is resting, each support member comprising upper and lower molded sheets of substantially uniform thickness throughout, each sheet having a plurality of alternately arranged hollow pocket and post formations, the lower sheet being inverted relative to the upper sheet with the pocket formations of the upper sheet nested inside the hollow post formations of the inverted lower sheet, and means securing the sheets together.

2. A pallet as in claim 1 wherein the upper sheet of each support member is oriented 90° relative to the inverted lower sheet.

3. A pallet as in claim 1 wherein the upper sheet of each support member includes an outwardly directed peripheral flange, and means for securing the flange on each upper sheet to the underside of the load bearing platform.

4. A pallet as in claim 3 including a lower platform and an outwardly directed peripheral flange on the inverted lower sheet of each support member, and means for securing the flange on each lower sheet to the upper side of the lower platform.

5. A pallet as in claim 1 wherein the upper and lower sheets of each support member are secured together with adhesive.

6. A pallet as in claim 1 wherein the upper and lower sheets of each support member are made of fibrous pulp.

7. A pallet as in claim 1 wherein the upper and lower sheets of each support member are identical.

8. A pallet as in claim 1 wherein the exterior end portions of the hollow pocket formations of the upper sheet are spaced from the interior end portions of the hollow post formations of the lower sheet when the pocket formations of the upper sheet are fully nested inside the hollow post formations of the inverted lower sheet.

9. A composite support member comprising upper and lower molded sheets of substantially uniform thickness throughout, each sheet having a plurality of alternately arranged hollow pocket and post formations, the lower sheet being inverted relative to the upper sheet with the pocket formations of the upper sheet nested inside the hollow post formations of the inverted lower sheet, and means securing the sheets together.

10. A composite support member as in claim 9 wherein the upper sheet is oriented 90° relative to the inverted lower sheet.

11. A composite support member as in claim 9 wherein the upper and lower molded sheets are identical.

12. A composite support member as in claim 9 wherein each molded sheet includes an upper outwardly directed peripheral flange.

13. A composite support member as in claim 9 wherein the molded sheets are made of fibrous pulp.

14. A composite support member as in claim 9 wherein the exterior end portions of the hollow pocket formations of the upper sheet are spaced from the interior end portions of the hollow post formations of the lower sheet when the pocket formations of the upper sheet are fully nested inside the hollow post formations of the inverted lower sheet.

* * * * *